United States Patent
Cho et al.

(10) Patent No.: US 11,776,259 B2
(45) Date of Patent: Oct. 3, 2023

(54) CONTROL SYSTEM OF TRAFFIC LIGHTS AND METHOD THEREOF

(71) Applicant: PiXORD Corporation, Hsin-Chu (TW)

(72) Inventors: Hsun-Jung Cho, Hsinchu (TW); Hung-Hsun Chen, New Taipei (TW); Yi-Jung Wu, Hsinchu (TW)

(73) Assignee: PIXORD CORPORATION, Hsin-Chu (TW)

( * ) Notice: Subject to any disclaimer, the term of this patent is extended or adjusted under 35 U.S.C. 154(b) by 361 days.

(21) Appl. No.: 17/037,317

(22) Filed: Sep. 29, 2020

(65) Prior Publication Data

US 2021/0334550 A1  Oct. 28, 2021

Related U.S. Application Data

(60) Provisional application No. 63/014,091, filed on Apr. 22, 2020.

(30) Foreign Application Priority Data

Aug. 3, 2020 (TW) ................................ 109126191

(51) Int. Cl.
| | |
|---|---|
| *G06V 20/54* | (2022.01) |
| *G06V 20/40* | (2022.01) |
| *G08G 1/01* | (2006.01) |
| *G08G 1/07* | (2006.01) |
| *G06V 10/56* | (2022.01) |

(52) U.S. Cl.
CPC ............. *G06V 20/40* (2022.01); *G06V 10/56* (2022.01); *G06V 20/54* (2022.01); *G08G 1/0116* (2013.01); *G08G 1/07* (2013.01); *G06V 2201/08* (2022.01)

(58) Field of Classification Search
CPC ........ G06V 20/54; G06V 10/56; G06V 20/40; G06V 2201/08; G08G 1/0116; G08G 1/07; G08G 1/08; G08G 1/095; G06N 3/0454

See application file for complete search history.

(56) References Cited

U.S. PATENT DOCUMENTS

| | | | |
|---|---|---|---|
| 8,825,350 B1 * | 9/2014 | Robinson | G08G 1/042 340/916 |
| 10,354,523 B2 * | 7/2019 | Jin | G08G 1/0133 |

(Continued)

FOREIGN PATENT DOCUMENTS

| | | |
|---|---|---|
| CN | 101197080 A | 6/2008 |
| CN | 101763734 B | 6/2010 |

(Continued)

OTHER PUBLICATIONS

A kind of time headway modeling method and a kind of minimum green time calculation method (Year: 2019).*

(Continued)

*Primary Examiner* — Solomon G Bezuayehu

(74) *Attorney, Agent, or Firm* — Muncy, Geissler, Olds & Lowe, P.C.

(57) ABSTRACT

A control method for traffic lights includes: acquiring an image at a preset time point before a red light is turned off, wherein the image includes at least one vehicle waiting for the red light; determining a time length according to the image, wherein the time length is generated by an artificial intelligence algorithm; and controlling a green light according to the time length.

18 Claims, 7 Drawing Sheets

(56) References Cited

U.S. PATENT DOCUMENTS

| | | | | |
|---|---|---|---|---|
| 2013/0300583 | A1* | 11/2013 | Wignot | G01S 13/91 340/907 |
| 2015/0206014 | A1* | 7/2015 | Wu | G06V 20/52 348/149 |
| 2015/0332097 | A1* | 11/2015 | Bulan | G06F 18/24 382/103 |
| 2018/0190111 | A1* | 7/2018 | Green | G08G 1/0133 |
| 2019/0088120 | A1* | 3/2019 | Adireddy | G08G 1/083 |
| 2019/0311619 | A1* | 10/2019 | Tao | G08G 1/0145 |
| 2020/0072965 | A1* | 3/2020 | Cao | G08G 1/04 |
| 2020/0097769 | A1* | 3/2020 | Lipchin | G06V 40/167 |
| 2020/0135018 | A1* | 4/2020 | Baik | G08G 1/0145 |
| 2020/0184244 | A1* | 6/2020 | Mansour | G06F 18/214 |
| 2020/0202710 | A1* | 6/2020 | Gao | G08G 1/0145 |
| 2020/0210696 | A1* | 7/2020 | Hou | G06V 10/242 |
| 2020/0410856 | A1* | 12/2020 | Deruytter | G06V 20/54 |
| 2021/0009365 | A1* | 1/2021 | Ganesh | G01C 21/26 |
| 2021/0174669 | A1* | 6/2021 | Guan | G06N 3/08 |
| 2021/0174677 | A1* | 6/2021 | Oh | G08G 1/095 |
| 2021/0241616 | A1* | 8/2021 | Abdulhai | G08G 1/0129 |
| 2022/0020271 | A1* | 1/2022 | Foley | G08G 1/0145 |
| 2022/0108607 | A1* | 4/2022 | Dong | G08G 1/0145 |
| 2022/0375340 | A1* | 11/2022 | Pittman | G08G 1/0116 |

FOREIGN PATENT DOCUMENTS

| | | | | |
|---|---|---|---|---|
| CN | 102063796 | A | | 5/2011 |
| CN | 101763734 | A | | 6/2011 |
| CN | 104157155 | A | | 11/2014 |
| CN | 106056931 | A | | 10/2016 |
| CN | 106056931 | A | * | 10/2016 |
| CN | 107134156 | A | | 9/2017 |
| CN | 107146429 | A | | 9/2017 |
| CN | 108986493 | A | * | 12/2018 ............... G08G 1/08 |
| CN | 109035807 | A | | 12/2018 |
| CN | 110070733 | A | | 7/2019 |
| CN | 106683447 | B | | 11/2019 |
| CN | 110660234 | A | | 1/2020 |
| CN | 110910665 | A | | 3/2020 |
| CN | 110969845 | A | | 4/2020 |
| JP | 2000172987 | A | * | 6/2000 |
| JP | 2010224740 | A | * | 10/2010 |
| TW | 201901632 | A | | 1/2019 |
| TW | 201913594 | A | | 4/2019 |
| WO | 2015/166876 | A1 | | 11/2015 |
| WO | 2019/130300 | A1 | | 7/2019 |
| WO | WO-2019222358 | A1 | * | 11/2019 ......... G01C 21/3602 |
| WO | WO-2021142944 | A1 | * | 7/2021 ......... G06K 9/00771 |

OTHER PUBLICATIONS

Yu-Ting Wu, Zhi-Hua Zhang, Yi-Jie Liu, "Development of multi-time adaptive signal control system", Chinese Technology, No. 91, Jul. 2011, 11 pages.

Office Action dated Apr. 16, 2021 in TW Application 109126191, 6 pages.

Office Action dated May 6, 2021 in CN Application 202010796121.7, 9 pages.

Office Action dated Jan. 22, 2022 in corresponding TW Application 109126191, 9 pages.

\* cited by examiner

CONTROL SYSTEM OF TRAFFIC LIGHTS AND METHOD THEREOF

This application claims priority of Application No. 109126191 filed in Taiwan on 3 Aug. 2020 under 35 U.S.C. § 119; and this application claims priority of U.S. Provisional Application No. 63/014,091 filed on 22 Apr. 2020 under 35 U.S.C. § 119(e); the entire contents of all of which are hereby incorporated by reference.

BACKGROUND OF THE INVENTION

Field of the Invention

The present invention relates to a control system of traffic lights and a method thereof, in particular, to a control system using artificial intelligence to control traffic lights and a method thereof.

Description of the Prior Art

Most of the intersections will be set up traffic lights to control vehicles to move or stop. The red light time and the green light time of the traditional traffic lights are set based on experience, and the red light time and the green light time are not adjusted in real time according to the traffic flow. Therefore, when the traffic flow increases, the length of the green light time may be insufficient, such that the traffic flow can't be effectively relieved, which resulting in traffic congestion. In order to solve the problem of traffic congestion, the traditional method is to send the traffic police command on the spot, or let the surveillance personnel remotely control the traffic lights according to the images taken by the cameras installed at the intersection.

However, to control the traffic lights by manpower requires a very large number of personnel, and it is also difficult for personnel to conduct long-term uninterrupted command or monitoring.

SUMMARY OF THE INVENTION

One of objectives of the present invention is to provide a control system of traffic lights and a method thereof.

One of objectives of the present invention is to provide a control system capable of controlling a green light in real time according to the traffic flow and a method thereof.

According to the present invention, a control method for traffic lights, including the steps of: acquiring an image at a preset time point before a red light of the traffic lights is turned off, wherein the image includes at least one vehicle waiting for the red light; determining a time length according to the image, wherein the time length is generated by an artificial intelligence algorithm; and controlling a green light of the traffic lights according to the time length.

According to the present invention, a control system of traffic lights includes a camera and an artificial intelligence device. The camera captures an image at a preset time point before a red light of the traffic lights is turned off, wherein the image includes at least one vehicle waiting for the red light. The artificial intelligence device is connected to the camera in a wired or wireless manner. The artificial intelligence device includes an artificial intelligence algorithm for determining a time length for controlling a green light of the traffic lights according to the image.

The control system and method of the present invention can adjust the time of the green light in real time according to the current traffic flow. Therefore, it may effectively relieve the traffic flow and solve the problem of traffic congestion.

DESCRIPTION OF THE PREFERRED EMBODIMENTS

Figure 1:
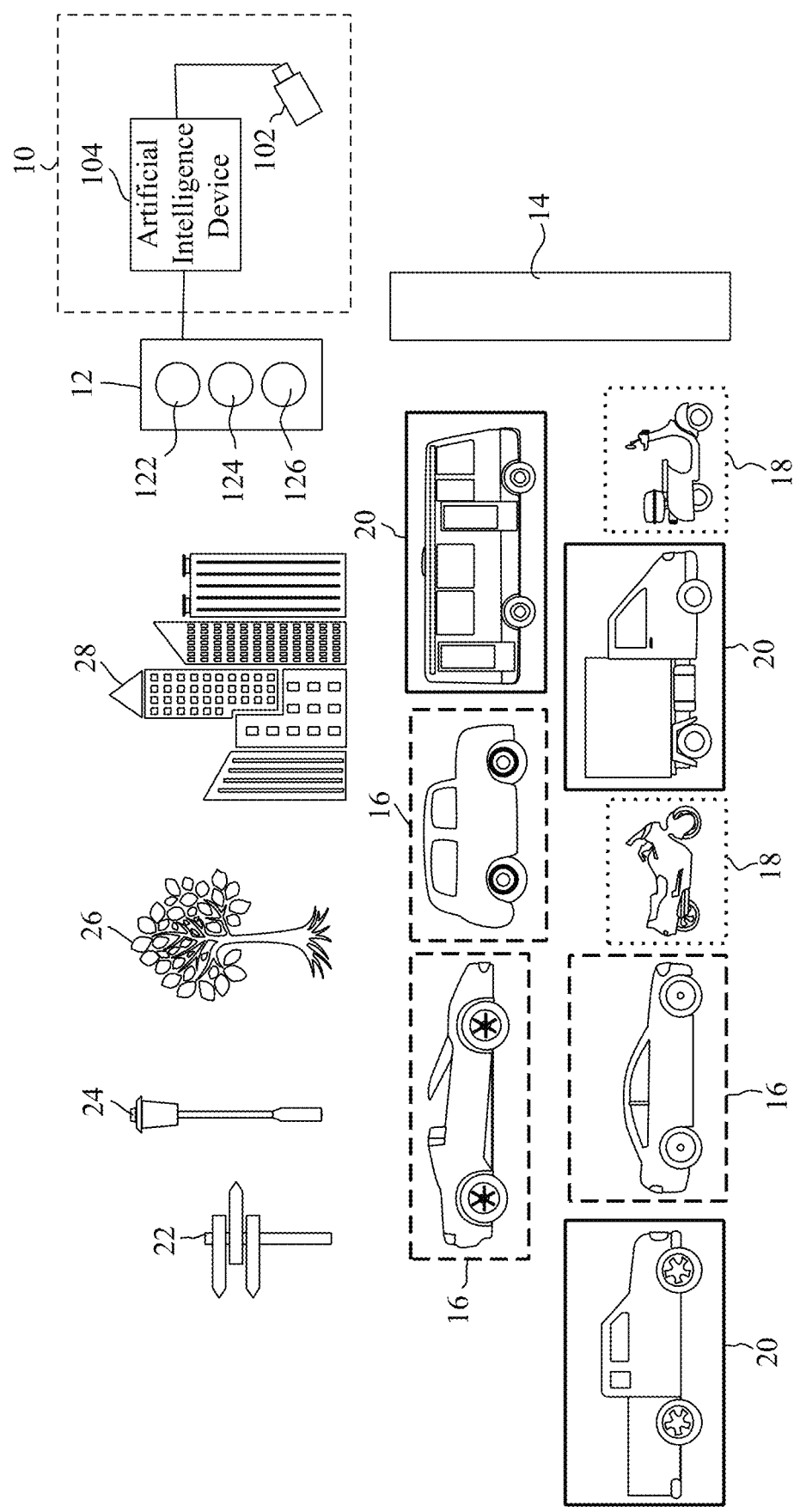
FIG. 1 shows a schematic diagram of an application of a control system of the present invention.
Figure 2:
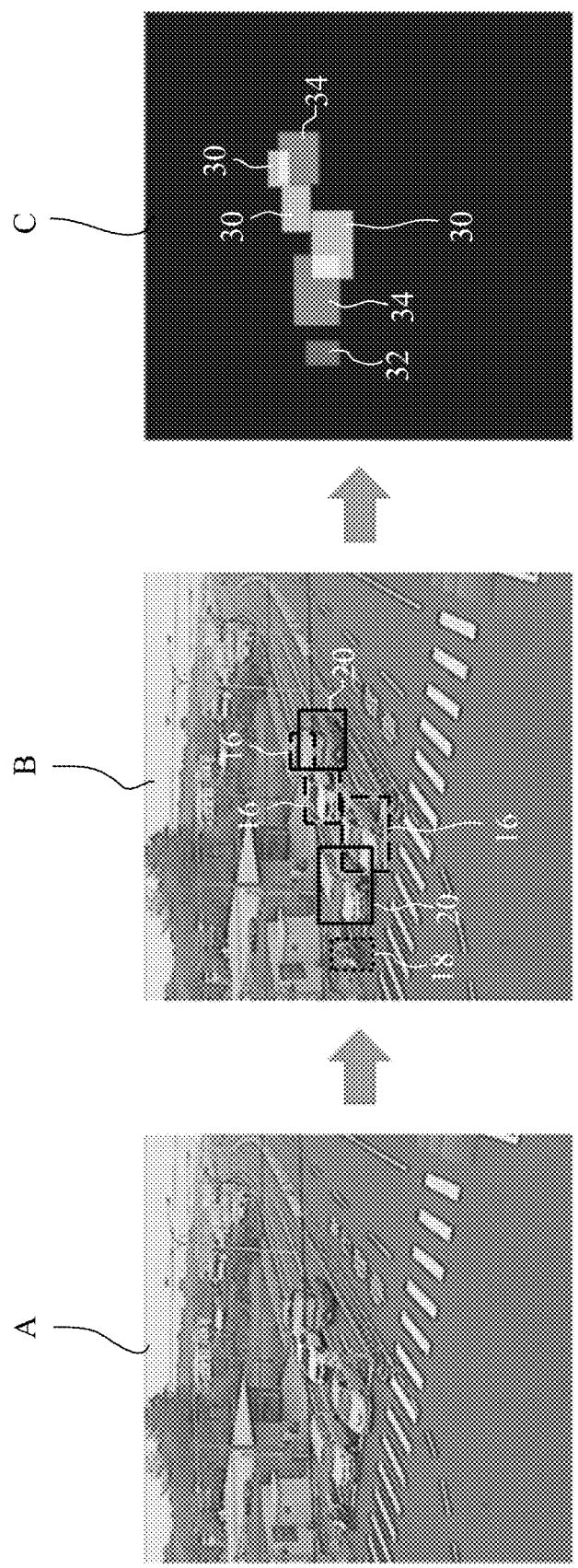
FIG. 2 shows an embodiment of image processing in the present invention.

FIG. 1 shows a schematic diagram of the application of the traffic light control of the present invention. The control system 10 of the present invention uses artificial intelligence (AI) to control the traffic lights 12 mounted at an intersection. The traffic lights 12 include a red light 122, a yellow light 124 and a green light 126. In an embodiment, the traffic lights 12 may also include two or more green lights, such as a green light indicating turning left (left-turn signal) or a green light indicating turning right (right-turn signal). With reference to FIG. 1, each component in the control system 10 may be arranged on the same bracket as the traffic lights 12, but it is not limited to this. The control system 10 includes a camera 102 and an artificial intelligence device 104. The camera 102 is used to shoot the intersection to obtain a video of the intersection, and the video is composed of a plurality of continuous images. In an embodiment, the camera 102 is a fisheye camera. A range captured by the camera 102 includes at least a section of a road in front of the traffic lights 12, and the road may include one or more lanes. When the red light 122 of the traffic lights 12 is turned on, various types of vehicles will stop in front of the stop line 14 at the intersection. Then, the camera 102 captures a video of at least one vehicle that is waiting for the red light 122. The vehicles mentioned here include various transportation such as cars and scooters. The camera 102 captures an image A at a preset time point t before the red light 122 is turned off, for example, 3 seconds before the red light 122 is turned off. The camera 102 transmits the image A (as shown in FIG. 2) to the artificial intelligence device 104 in a wired or wireless manner. In another embodiment, the camera 102 may transmit the video to the artificial intelligence device 104, and the artificial intelligence device 104 acquires the image A taken at the preset time point t from a plurality of continuous images of the video. The artificial intelligence device 104 is connected to the traffic lights 12 in a wired or wireless manner. The artificial intelligence device 104 determines a time length T according to the image A, and the time length T is used to control the time for the turning on the green light 126. The time length T is an estimated value. In the embodiment of FIG. 1, the time length T is estimated by the artificial intelligence device 104 and represents the time that all the vehicles in at least one lane in the image A pass the stop line 14 after the red light 122 is turned off and the green light 126 is turned on. However, the time length T of the present invention is not limited to the time for all vehicles to pass the stop line 14. In an embodiment, the artificial intelligence device 104 controls the green light 126 according to the time length T. In another embodiment, the artificial intelligence control device 104 transmits the time length T to a remote server, and the server generates a timing plan according to the time length T to control the green light 126.

Figure 3:
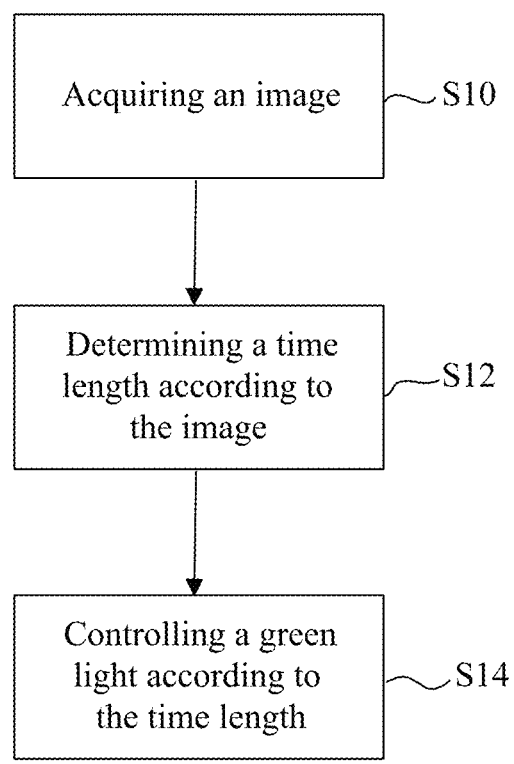
FIG. 3 shows an embodiment of a control method of the present invention.

It can be understood from the above description that the present invention provides a control method for traffic lights as shown in FIG. 3. With reference to FIGS. 1 and 3, the control method of the present invention is to acquire an image A at a preset time point t before the red light 122 is turned off, as shown in the step S10. The image A includes at least one vehicle waiting for the red light 122. In an embodiment, the camera 102 may be used to capture at the preset time point t to acquire the image A, and the camera 102 then transmits the image A to the artificial intelligence device 104 in a wired or wireless manner. In another embodiment, the camera 102 shoots a plurality of continuous images to generate a video, the camera 102 transmits the video to the artificial intelligence device 104, and then the artificial intelligence device 104 acquires the image A taken at the preset time point t from the plurality of continuous images of the video. The step S12 is performed after image A is acquired. The step S12 comprises determining a time length T according to image A. The time length T is generated through an artificial intelligence algorithm in the artificial intelligence device 104. In an embodiment, the time length T is estimated by the artificial intelligence device 104 and represents the time that all the vehicles in at least one lane in the image A pass the stop line 14 after the red light 122 is turned off and the green light 126 is turned on. Finally, the present invention controls the green light 126 according to the time length T, as shown in the step S14. In an embodiment, the artificial intelligence device 104 controls the green light 126 according to the time length T. In another embodiment, the artificial intelligence control device 104 transmits the time length T to a remote server, and the server generates a timing plan according to the time length T to control the green light 126.

Figure 4:
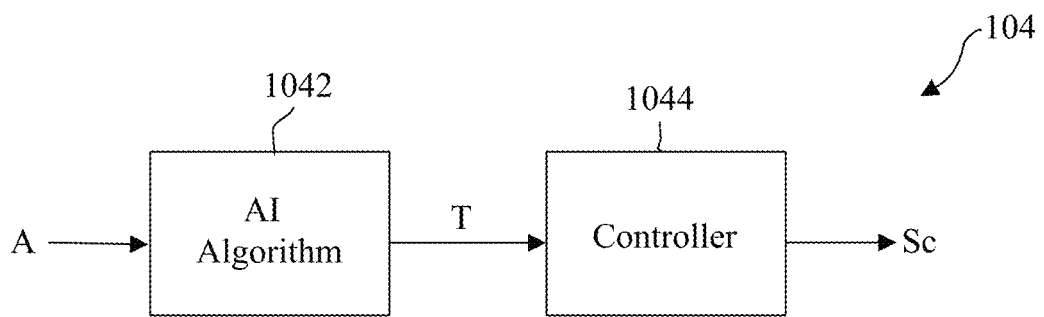
FIG. 4 shows a first embodiment of an artificial intelligence device in FIG. 1.
Figure 5:
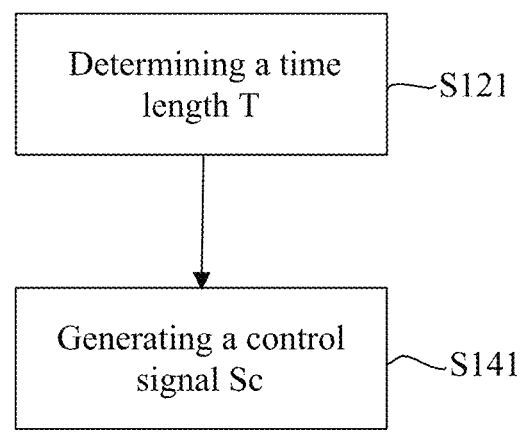
FIG. 5 shows operation steps of an artificial intelligence device in FIG. 4.

FIG. 4 shows a first embodiment of the artificial intelligence device 104 of FIG. 1. The artificial intelligence device 104 includes an artificial intelligence (AI) algorithm 1042 and a controller 1044, wherein the AI algorithm 1042 may be implemented by hardware circuit or software. FIG. 5 shows an operation embodiment of the artificial intelligence device 104 in FIG. 4. The steps S121 and S141 in FIG. 5 correspond to the steps S12 and S14 in FIG. 3, respectively. With reference to FIGS. 4 and 5, after the artificial intelligence device 104 acquires the image A, the AI algorithm 1042 in the artificial intelligence device 104 generates the time length T according to the image A, as shown in step S121. The AI algorithm 1042 may be, but is not limited to, a Convolutional Neural Network (CNN). CNN includes a feature extraction part and a regression part. The feature extraction part is used to extract features from the image to generate feature information, and the regression part generates a time length T according to the feature information. The controller 1044 controls the time length for turning on the green light 126. In the embodiment of FIG. 4, the controller 1044 receives the time length T, and generates a control signal Sc to the traffic lights 12 according to the time length T to control the time length for turning on the green light 126, as shown in step S141 of FIG. 5.

Figure 6:
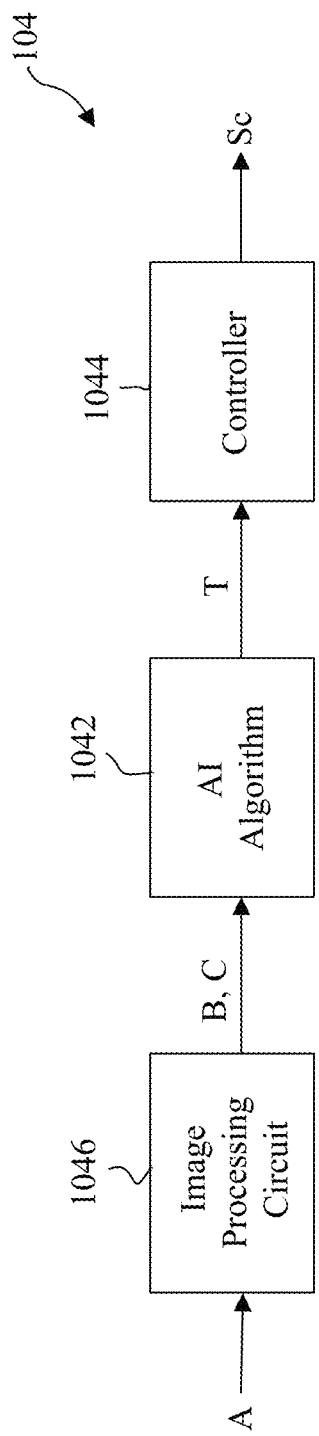
FIG. 6 shows a second embodiment of an artificial intelligence device in FIG. 1.
Figure 7:
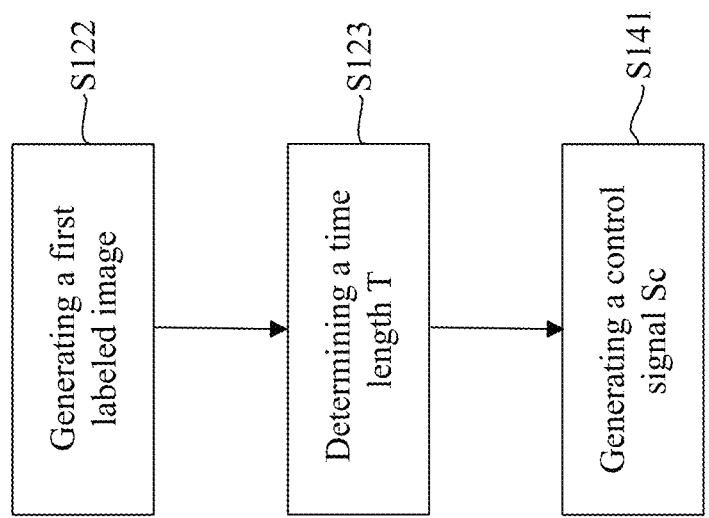
FIG. 7 shows a first operation embodiment of an artificial intelligence device in FIG. 6.

FIG. 6 shows a second embodiment of the artificial intelligence device 104 in FIG. 1. In addition to the AI algorithm 1042 and the controller 1044, the artificial intelligence device 104 in FIG. 6 further includes an image processing circuit 1046 between the camera 102 and the AI algorithm 1042. FIG. 7 shows a first operation embodiment of an artificial intelligence device 104 in FIG. 6. A combination of steps S122 and S123 in FIG. 7 can be understood as an embodiment of the step S12 in FIG. 3, and the step S141 in FIG. 7 corresponds to the step S14 in FIG. 3. With reference to FIGS. 6 and 7, after the artificial intelligence device 104 acquires the image A, step S122 is performed first. In the step S122, the image processing circuit 1046 preprocesses the image A. The preprocessing includes classifying and labeling all the vehicles in the image A to generate a first labeled image B (as shown in FIG. 2). The image processing circuit 1046 may use, but is not limited to, a computer vision algorithm or an AI vision detection algorithm to classify and label at least one vehicle in the image A. In an embodiment, the way to classify vehicles includes classification by vehicle types, such as classifying into buses, cars, scooters, and trucks. In an embodiment, the vehicles in image A may be labeled with different colored labeling frames. For example, as shown in FIG. 2, cars are labeled with a green labeling frame 16, scooters are labeled with a blue labeling frame 18, and buses and trucks are labeled with a red labeling frame 20. Then, step S123 is performed to analyze the first labeled image B by the AI algorithm 1042 to generate the time length T. Different types of vehicles have different reaction times from when the green light 126 is turned on to when they start to move. Generally, the reaction time of scooters is faster, and the reaction time of buses and trucks is slower. Therefore, vehicles behind buses or trucks may take more time to pass stop line 14 or the intersection. The AI algorithm 1042 of the present invention estimates the time length T for all vehicles to pass the stop line 14 based on the position relationship between different types of vehicles in the labeled image B. Finally, the controller 1044 generates a control signal Sc to the traffic lights 12 according to the time length T to control the time length for turning on the green light 126, as shown in the step S141.

Figure 8:
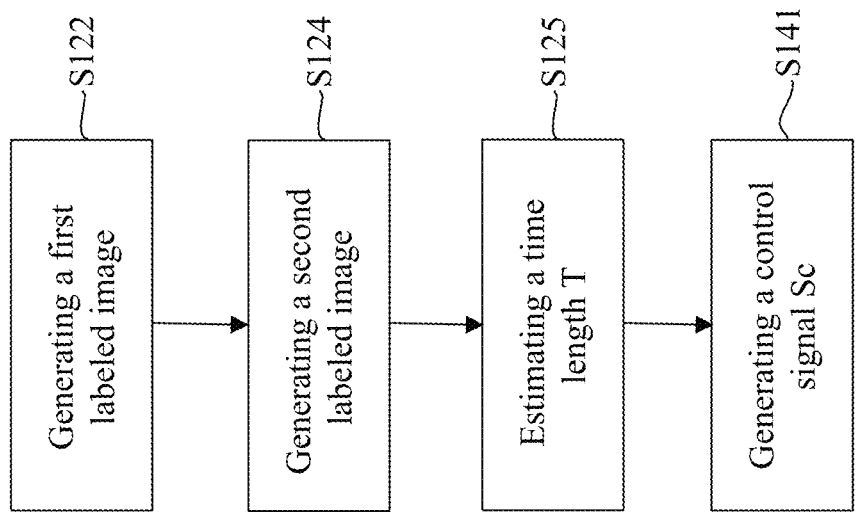
FIG. 8 shows a second operation embodiment of an artificial intelligence device in FIG. 6.

FIG. 8 shows a second operation embodiment of the artificial intelligence device 104 of FIG. 6. A combination of steps S122, S124 and S125 in FIG. 8 can be understood as another embodiment of step S12 in FIG. 3, and the step S141 in FIG. 8 corresponds to the step S14 in FIG. 3. With reference to FIGS. 6 and 8, after the artificial intelligence device 104 acquires the image A, the image processing device 1046 preprocesses the image A, as shown in steps S121 and S124. Specifically, the image processing device 1046 first classifies and labels all the vehicles in the image A to generate a first labeled image B, as shown in the step S122. Then, in order to prevent objects (such as road signs 22, street lights 24, road trees 26, and buildings 28 shown in FIG. 1) other than vehicles from affecting the following determination, the image processing circuit 1046 ignores the objects other than the vehicle in the first labeled image B to generate a second labeled image C, as shown in step S124. In the embodiment of FIG. 2, the second labeled image C has a black background and uses different color blocks to indicate different types of vehicles. For example, cars are labeled with a green color block 30, scooters are labeled with a blue color block 32, and buses and trucks are labeled with a red color block 34. The second labeled image C of the present invention is not limited to the embodiment shown in FIG. 2. Subsequently, step S125 is performed to analyze the second labeled image C by the AI algorithm 1042 to generate the time length T. Similarly, the AI algorithm 1042 of the present invention estimates a time length T according to the position relationship between different types of vehicles in the second labeled image C. Finally, the controller 1044 generates a control signal Sc to the traffic lights 12 according to the time length T to control the time length for turning on the green light 126, as shown in the step S141.

The AI algorithm 1042 of the artificial intelligence device 104 in FIGS. 4 and 6 has to be trained in advance to have the ability to estimate a time length T. The training method includes preparing many different images I. These images I may be taken at the intersection as shown in FIG. 1, for example. These images I are taken at different time points, and each image I is taken at a preset time point t before the red light 122 is turned off. In another aspect, an actual time Tr for all vehicles in each image I to pass through the stop line 14 has to be measured. These images I and their respective actual times Tr are provided to a training program Pt. The training program Pt has the same architecture as the AI algorithm 1042, such as the CNN architecture. The training program Pt obtains a set of coefficients for estimating the time length T according to the images I and the corresponding actual times Tr. The AI algorithm 1042 uses the set of coefficients to perform operations and analyze the image A, and estimate the time length T for all vehicles in the image A to pass the stop line 14. The above training process may be understood as making the training program Pt learn to estimate how much time is needed for the vehicle in the image to pass the stop line 14 according to the image. Through the above training process, the AI algorithm 1042 has the ability to estimate a time length T according to the image A.

Figure 9:
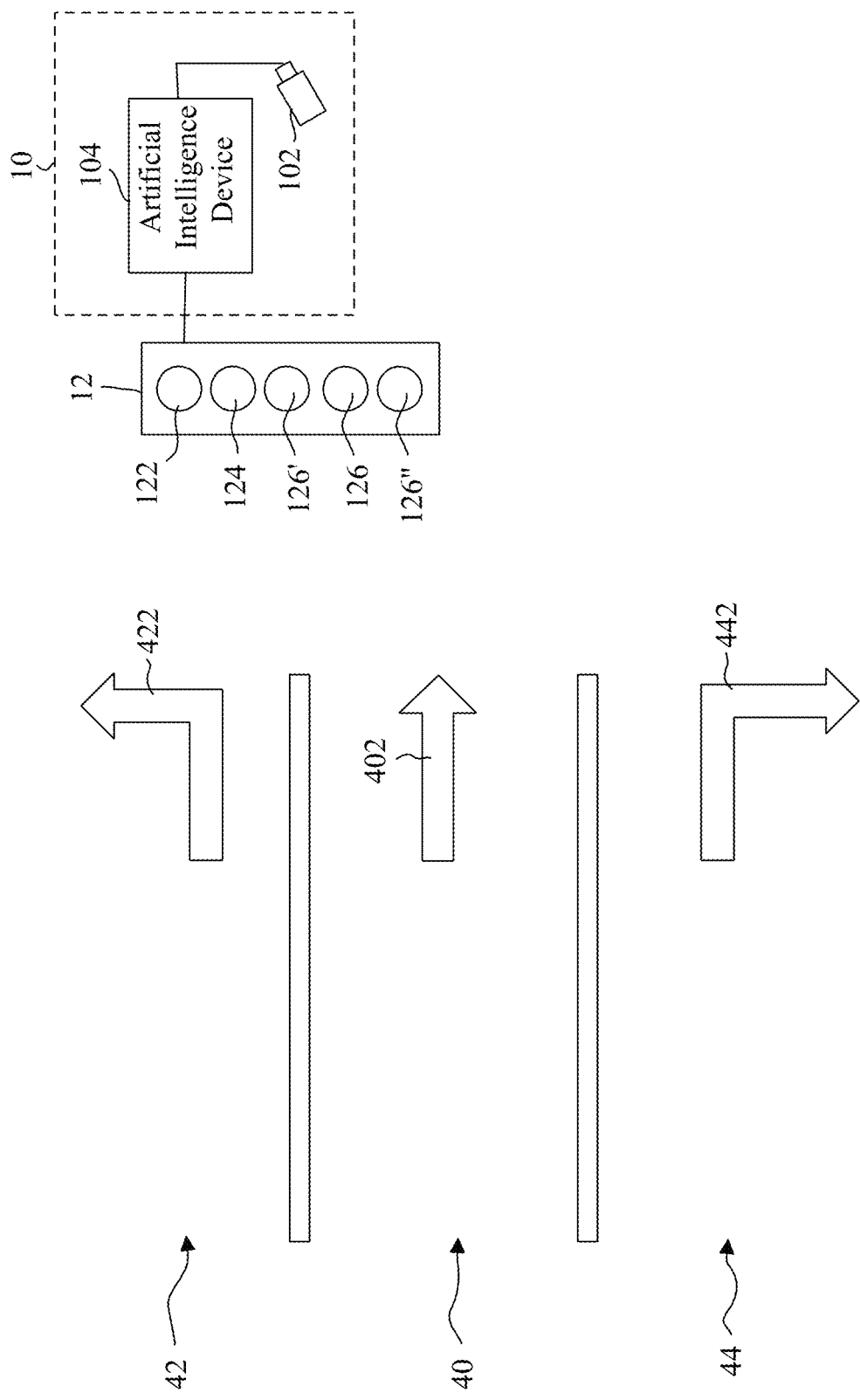
FIG. 9 shows a schematic diagram of the control system of the present invention applied to a road with a plurality of lanes.

In different embodiments, the traffic lights 12 may further include a right turn light 126" and a left turn light 126'; in addition to the through lane 40, the road where the traffic light 12 is located further includes a left turn lane 42 and a right turn lane 44, as shown in FIG. 9. According to the present invention, the image A captured by the camera 12 may be divided into an image Ad of the through lane 40, an image Al of the left turn lane 42, and an image Ar of the right turn lane 44. In other words, the present may obtain the image Ad of the through lane, the image Al of the left turn lane, and/or the image Ar of the right turn lane from the image A. In an embodiment, the artificial intelligence device 104 recognizes different lanes by detecting the arrows 402, 422, and 442 on the road in the image A. In general, the left turn lane 42 will be labeled with the arrow 422 representing a left turn, the right turn lane 44 will be labeled with the arrow 442 representing a right turn, and the through lane 40 will be labeled with the arrow 402 representing going straight. The AI algorithm 1042 generates the time length T1 according to of the image Ad to control the green light 126, generates the time length T2 according to the image Al to control the left turn light 126', and generates the time length T3 according to the image Ar to control the right turn light 126". In view of this situation, to train the AI algorithm 1042 to estimate the time T1, it is necessary to provide many images of the through lane to the training program Pt. To train the AI algorithm 1042 to estimate the time T2, it is necessary to provide many images of the left turn lane to the training program Pt. To train the AI algorithm 1042 to estimate the time T3, it is necessary to provide many images of the right turn lane to the training program Pt. The rest of the details are similar to the aforementioned training process, and will not be repeated here.

In the embodiment of FIGS. 4 and 6, the controller 1044 is set in the artificial intelligence device 104, and the controller 1044 may be a computer or a hardware circuit for controlling the traffic lights 12. In different embodiments, the controller 1044 may be arranged outside the control system 10, for example, the controller 1044 may be in a remote traffic control center (not shown). In this case, the control system 10 transmits the time length T to the controller 1044 in the remote control center in a wired or wireless manner, and then the controller 1044 generates a control signal Sc according to the time length T to control the lighting time of the green light 126 via a wired or wireless network.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A control method for traffic lights including a red light and a green light, comprising the steps of:
   A. acquiring a first image at a preset time point before the red light is turned off, wherein the first image includes vehicles stopped at the red light;
   B. preprocessing the first image to generate a second image, wherein the step B comprises classifying and labeling different types of vehicles in the first image;
   C. extracting features from the second image by an artificial intelligence algorithm to generate a feature information, and determining a position relationship between the different types of vehicles on multiple lanes in the second image based on the feature information;
   D. determining a time length by the artificial intelligence algorithm according to the determined position relationship; and
   E. controlling the green light according to the time length.

2. The control method according to claim 1, wherein the artificial intelligence algorithm is implemented by a convolutional neural network.

3. The control method according to claim 1, wherein the step of classifying and labeling the different types of vehicles in the first image is implemented by a computer vision algorithm or an artificial intelligence vision detection algorithm.

4. The control method according to claim 1, wherein the step of classifying and labeling comprises indicating vehicles of different types that are labeled with different color blocks.

5. The control method according to claim 4, wherein the step of classifying and labeling the different types of vehicles in the first image is implemented by a computer vision algorithm or an artificial intelligence vision detection algorithm.

6. The control method according to claim 1, wherein the step A comprises:
   acquiring a video of an intersection; and
   acquiring the first image taken at the preset time point according to a plurality of continuous images in the video.

7. The control method according to claim 1, wherein the first image comprises images of a through lane, a left turn lane, and/or a right turn lane.

8. The control method according to claim 7, further comprising:
   detecting an arrow on a road in the first image to acquire an image of the through lane, an image of the right turn lane, or an image of the left turn lane from the first image.

9. The control method according to claim 8, wherein the step D further comprises determining the time length according to the image of the through lane, the image of the right turn lane, or the image of the left turn lane.

10. A control system for traffic lights including a red light and a green light, comprising:
   a camera, configured to capture a first image at a preset time point before the red light is turned off, wherein the first image includes vehicles on multiple lanes stopped at the red light; and
   an artificial intelligence device, connected to the camera in a wired or wireless manner, comprising:
   an image processing circuit connected to the camera for classifying and labeling the different types of vehicles in the first image to generate a second image; and
   an artificial intelligence algorithm configured to perform a set of steps comprising:
   A. extracting features from the second image to generate a feature information, and determining a position relationship between the different types of vehicles on multiple lanes in the second image based on the feature information;
   B. determining a time length for controlling the green light according to the determined position relationship; and
   C. controlling the green light according to the time length.

11. The control system according to claim 10, wherein the artificial intelligence algorithm is implemented with a convolutional neural network.

12. The control system according to claim 10, wherein the image processing circuit classifies and labels the different types of vehicles by a computer vision algorithm or an artificial intelligence vision detection algorithm.

13. The control system according to claim 10, wherein the image processing circuit further indicates vehicles of different types that are labeled with different color blocks.

14. The control system according to claim 13, wherein the image processing circuit classifies and labels the different types of vehicles by a computer vision algorithm or an artificial intelligence vision detection algorithm.

15. The control system according to claim 10, wherein the camera acquires a video of an intersection, and the artificial intelligence device obtains the first image at the preset time point from the video.

16. The control system according to claim 10, wherein the first image comprises a through lane, a left turn lane, and/or a right turn lane.

17. The control system according to claim 16, wherein the artificial intelligence device detects an arrow on a road in the first image to acquire an image of the through lane, an image of the right turn lane, or an image of the left turn lane from the first image.

18. The control system according to claim 17, wherein the artificial intelligence algorithm determines the time length according to the image of the through lane, the image of the right turn lane, or the image of the left turn lane.

* * * * *